US008775758B2

(12) United States Patent
Tomlin et al.

(10) Patent No.: US 8,775,758 B2
(45) Date of Patent: Jul. 8, 2014

(54) MEMORY DEVICE AND METHOD FOR PERFORMING A WRITE-ABORT-SAFE FIRMWARE UPDATE

(75) Inventors: Andrew Tomlin, San Jose, CA (US); Dennis S. Ea, Hayward, CA (US); Daniel E. Tuers, Mountain View, CA (US)

(73) Assignee: SanDisk Technologies Inc., Plano, TX (US)

( * ) Notice: Subject to any disclaimer, the term of this patent is extended or adjusted under 35 U.S.C. 154(b) by 776 days.

(21) Appl. No.: 12/005,727

(22) Filed: Dec. 28, 2007

(65) Prior Publication Data

US 2009/0172252 A1   Jul. 2, 2009

(51) Int. Cl.
G06F 12/02 (2006.01)
(52) U.S. Cl.
USPC .......... 711/165; 711/103; 711/E12.002; 711/E12.008; 713/2; 717/168
(58) Field of Classification Search
None
See application file for complete search history.

(56) References Cited

U.S. PATENT DOCUMENTS

| 4,677,606 | A |   | 6/1987  | Ogata et al.    |
|-----------|---|---|---------|-----------------|
| 5,321,651 | A |   | 6/1994  | Monk            |
| 5,576,989 | A |   | 11/1996 | Kowalski        |
| 5,826,012 | A | * | 10/1998 | Lettvin .......... 726/22 |
| 5,838,614 | A |   | 11/1998 | Estakhri et al. |
| 5,893,118 | A |   | 4/1999  | Sonderegger     |
| 6,185,699 | B1 |  | 2/2001  | Haderle et al.  |
| 6,385,744 | B1 |  | 5/2002  | Ando et al.     |
| 6,512,702 | B1 |  | 1/2003  | Nakamura et al. |
| 6,535,949 | B1 |  | 3/2003  | Parker          |
| 6,564,307 | B1 |  | 5/2003  | Micka et al.    |
| 6,601,132 | B2 |  | 7/2003  | Nomura et al.   |
| 6,646,921 | B2 |  | 11/2003 | Roohparvar      |
| 6,662,334 | B1 |  | 12/2003 | Stenfort        |

(Continued)

FOREIGN PATENT DOCUMENTS

EP      0 454 340    10/1991
EP      0 762 282     3/1997

(Continued)

OTHER PUBLICATIONS

Hazen, Peter; Using Intel's Boot Block Flash Memory Parameter Blocks to Replace Eeprom; Intel; Nov. 1995.*

(Continued)

Primary Examiner — Reginald Bragdon
Assistant Examiner — Eric Loonan
(74) Attorney, Agent, or Firm — Brinks Gilson & Lione (57) ABSTRACT

A memory device and method for performing a write-abort-safe firmware update are disclosed. In one embodiment, a location in a memory of a memory device for a firmware update is allocated. The firmware update is written into the allocated location in the memory. A pointer is written to the firmware update in a directory, and a pointer is written to the directory in a location in the memory that is read during boot-up. In another embodiment, a block in a memory of a memory device is allocated for updated file system data comprising a firmware update and a directory. The updated file system data is written into the allocated location in the memory. A pointer is written to the firmware update in the directory, and a pointer is written to the updated file system data in a boot block in the memory, wherein the boot block is read during boot-up.

40 Claims, 7 Drawing Sheets

(56) References Cited

U.S. PATENT DOCUMENTS

| | | | |
|---|---|---|---|
| 6,751,750 | B1 | 6/2004 | Humlicek |
| 6,754,828 | B1* | 6/2004 | Marisetty et al. ............... 726/2 |
| 7,254,592 | B1 | 8/2007 | Matero |
| 7,340,651 | B2 | 3/2008 | Coldicott et al. |
| 7,363,540 | B2 | 4/2008 | Patel et al. |
| 2002/0026566 | A1 | 2/2002 | Awada et al. |
| 2002/0069314 | A1 | 6/2002 | Miyauchi |
| 2003/0099134 | A1 | 5/2003 | Lasser et al. |
| 2003/0163663 | A1 | 8/2003 | Aasheim et al. |
| 2004/0095666 | A1 | 5/2004 | Asano et al. |
| 2005/0036390 | A1 | 2/2005 | Nakada et al. |
| 2005/0144362 | A1 | 6/2005 | Lin et al. |
| 2005/0246487 | A1 | 11/2005 | Ergan et al. |
| 2005/0273551 | A1 | 12/2005 | Keays |
| 2006/0155922 | A1* | 7/2006 | Gorobets et al. ............ 711/103 |
| 2008/0016107 | A1 | 1/2008 | Worrall |
| 2008/0282025 | A1* | 11/2008 | Biswas et al. ................ 711/103 |
| 2008/0320245 | A1 | 12/2008 | Tomlin et al. |
| 2008/0320253 | A1 | 12/2008 | Tomlin et al. |
| 2010/0299494 | A1* | 11/2010 | Van Acht et al. ............ 711/166 |

FOREIGN PATENT DOCUMENTS

| | | |
|---|---|---|
| WO | WO 01/31458 | 5/2001 |
| WO | WO 03/010671 A1 | 2/2003 |
| WO | WO 2006/064498 | 6/2006 |

OTHER PUBLICATIONS

Tutorialspoint; C—Pointer to Pointer; http://www.tutorialspoint.com/cprogramming/c_pointer_to_pointer.htm.*

"Method for Writing Data of an Atomic Transaction to a Memory Device," U.S. Appl. No. 11/820,617, Inventors: Andrew Tomlin, Sergey A. Gorobets, Reuven Elhamias, Shai Traister, and Alan D. Bennett, filed Jun. 19, 2007.

"Memory Device with Circuitry for Writing Data of an Atomic Transaction," U.S. Appl. No. 11/820,670, Inventors: Andrew Tomlin, Sergey A. Gorobets, Reuven Elhamias, Shai Traister, and Alan D. Bennett, filed Jun. 19, 2007.

Office Action for U.S. Appl. No. 11/820,670, dated Aug. 19, 2009, 27 pages.

Office Action for U.S. Appl. No. 11/820,670, dated Feb. 23, 2010, 27 pages.

Office Action for U.S. Appl. No. 11/820,670, dated May 23, 2011, 26 pages.

Office Action for U.S. Appl. No. 11/820,670, dated Nov. 23, 2010, 18 pages.

Office Action for U.S. Appl. No. 11/820,617, dated Aug. 19, 2009, 27 pages.

Office Action for U.S. Appl. No. 11/820,617, dated Mar. 5, 2010, 18 pages.

Office Action for U.S. Appl. No. 11/820,617, dated Nov. 23, 2010, 17 pages.

Office Action for U.S. Appl. No. 11/820,617, dated May 23, 2011, 26 pages.

Search Report and Written Opinion for PCT Application No. PCT/US2008/007418, 9 pages, mailed Nov. 14, 2008.

Office Action for U.S. Appl. No. 11/820,617, dated Nov. 14, 2011, 26 pages.

* cited by examiner

(PRIOR ART)

MEMORY DEVICE AND METHOD FOR PERFORMING A WRITE-ABORT-SAFE FIRMWARE UPDATE

BACKGROUND

In some memory devices, main firmware code for the memory device is stored in physical blocks of memory that are outside of the user space in the memory. A processor in the memory device can load this main firmware from these blocks using computer-executable code stored in read only memory (ROM) in the memory device. The ROM code has limited functionality, as it is developed earlier in the product lifecycle than the main firmware. This functionality is typically limited to physical access, and, as such, the physical blocks of memory that store the main firmware cannot be managed as other system blocks, else the ROM code cannot locate them. Because of this, it can be difficult to perform a write-abort-safe firmware update on such memory devices, since a write-abort-safe firmware update is preferably performed in a "make-before-break" fashion, which can be particularly difficult if the firmware is stored redundantly.

SUMMARY

The present invention is defined by the claims, and nothing in this section should be taken as a limitation on those claims.

By way of introduction, the embodiments described below provide a memory device and method for performing a write-abort-safe firmware update. In one embodiment, a location in a memory of a memory device for a firmware update is allocated. The firmware update is written into the allocated location in the memory. A pointer is written to the firmware update in a directory, and a pointer is written to the directory in a location in the memory that is read during boot-up of the memory device. In another embodiment, a block in a memory of a memory device is allocated for updated file system data comprising a firmware update and a directory. The updated file system data is written into the allocated location in the memory. A pointer is written to the firmware update in the directory, and a pointer is written to the updated file system data in a boot block in the memory, wherein the boot block is read during boot-up of the memory device, and wherein the pointer to the directory is stored as a last-written sector in the boot block. Other embodiments are disclosed, and each of the embodiments can be used alone or together in combination.

The embodiments will now be described with reference to the attached drawings.

DETAILED DESCRIPTION OF THE PRESENTLY PREFERRED EMBODIMENTS

The following embodiments generally relate to a memory device and method for performing a write-abort-safe firmware update. Before turning to FIGS. 1-6, which illustrate these embodiments, a discussion is presented of FIG. 7, which shows a memory organization of a prior art memory device. During boot-up of the prior art memory device, a processor in the memory device would read and execute computer-executable instructions from a read only memory (ROM) 10 in the memory device. The instructions would contain a pointer to a location in a file system area 20 in a memory 30 of the memory device. The file system area 20 contains a directory that contains a list of files in the file system area 20, their locations, and their lengths. One of these files is firmware used to support the operation of the memory device. Other data in the file system area 20 can include, for example, internal operational code as well as other data to manage the operation of the memory device (e.g., resident code, overlay code, variables, etc.) and a "boot loader," which enables the processor to load the various files from the file system area 20. The directory in the file system area 20 effective points to a location of the firmware in the file system area 20. Separate from the file system area 20 is a user area 40 used to store user data and a hierarchy of control blocks 50 (e.g., boot blocks which point to a MAP block, a GAT block, and a scratch pad block) used to manage address translation in the user area 40. The hierarchy of control blocks 50 is completely separate and independent from the file system area 20.

Figure 7:
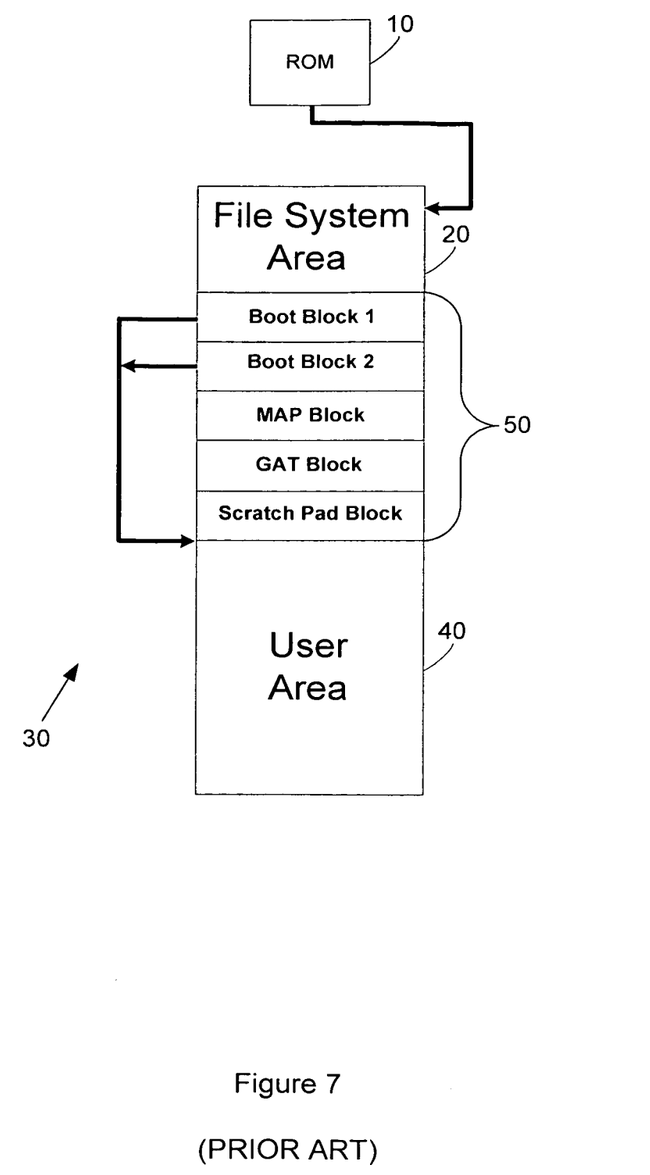
FIG. 7 is an illustration of a memory organization of a prior art memory device.

With this implementation, the ROM 10 provides the processor in the memory device with enough information to know where to find the directory in the file system area 20, and, with the information in the directory, the processor in the memory device can find the firmware in the file system area 20. Such an implementation using a directory provides one level of indirection between the ROM 10 and the firmware. (In contrast, with memory devices with zero levels of indirection, the firmware would always need to be located at the location specified in the code stored in the ROM 10, which is disadvantageous because the size of the firmware and any subsequent updates may not necessarily be known at the time of manufacture when the code in the ROM is written.) With one level of indirection, the ROM 10 does not need to know the name, location, or size of the firmware. It just needs to be able to read the directory in the file system area 20, which points to the location of the firmware.

While the use of one level of indirection provides the advantages discussed above, one level of indirection can make it difficult to perform an update to the firmware (e.g., to fix a bug or add a new feature in the field) in a manner that will survive a write abort. An update to firmware is preferably done in a make-before-break fashion, so that, if a write abort occurs before the firmware update is completed, a valid and intact copy of the firmware exists, so the memory device can still operate. A write-abort can be caused by various situations, including, but not limited to, loss of power to the memory device (e.g., if the memory device was removed from a host device that was supplying it power during the write operation), a power cycle of the memory device, a write-abort command issued during the write operation, and failure of memory cells. Because updating the firmware often means rewriting the entire block in the file system area 20 that both contains the firmware and the directory pointer to the firmware, performing a write-abort-safe firmware update could involve a very complicated, multi-state process.

The embodiments described below can be used to perform a write-abort-safe firmware update in a much simpler fashion. By way of introduction, unlike the prior memory organization shown in FIG. 7, in the memory organization of this embodiment, the hierarchy of control blocks is not completely separate and independent from the file system area. Instead, this embodiment leverages the hierarchy of control blocks to provide a second level of indirection to the firmware in the file system area. That is, instead of having two separate systems—a hierarchy of control blocks used to manage user data and a file system—this embodiment brings these two systems together by sharing the same root of information: the boot block. Specifically, in this embodiment, the boot block is moved to a location in memory that is read by the ROM code during boot-up, and a pointer is added to the boot block that points to the directory in the file system area, which points to the firmware in the file system area.

Figure 1:
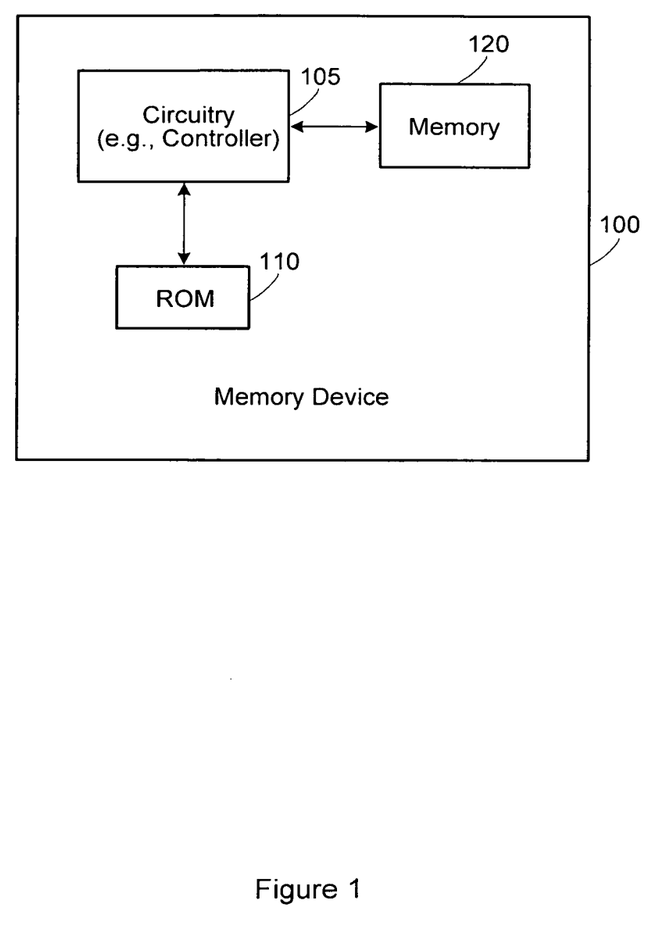
FIG. 1 is an illustration of a memory device of an embodiment.

Turning now to the drawings, FIG. 1 is an illustration of a memory device 100 of an embodiment. As shown in FIG. 1, the memory device 100 comprises circuitry 105 in communication with a read only memory (ROM) 110 and a memory 120. As used herein, the phrase "in communication with" means in direct communication with or in indirect communication with through one or more components, which may be named or unnamed herein. For simplicity, the term "circuitry" will be used herein to refer to a pure hardware implementation and/or a combined hardware/software (or firmware) implementation. Accordingly, "circuitry" can take the form of one or more of an application specific integrated circuit (ASIC), a programmable logic controller, an embedded microcontroller, and a single-board computer, as well as a processor executing computer-readable program code (e.g., software or firmware). In one presently preferred embodiment, the circuitry 105 takes the form of an ASIC controller running firmware stored in ROM 110 and/or the memory 120. It should also be noted that the memory 120 can take any suitable form. The memory 120 can be, for example, a solid-state, non-volatile memory (e.g., with flash EEPROM NAND-type memory cells). However, any type of memory can be used, such as, but not limited to, magnetic discs and optical CDs. Also, the memory device 100 can be contain other components, which are not shown in FIG. 1 for simplicity. For example, the memory device 100 (such as a memory card) can contain components (such as exposed electrical connectors, a wireless transmitter/receiver, etc.) that allow it to be put in communication with a host device, which can take the form of a personal computer (PC), a digital media (e.g., MP3) player, or a cell phone, for example.

Figure 2:
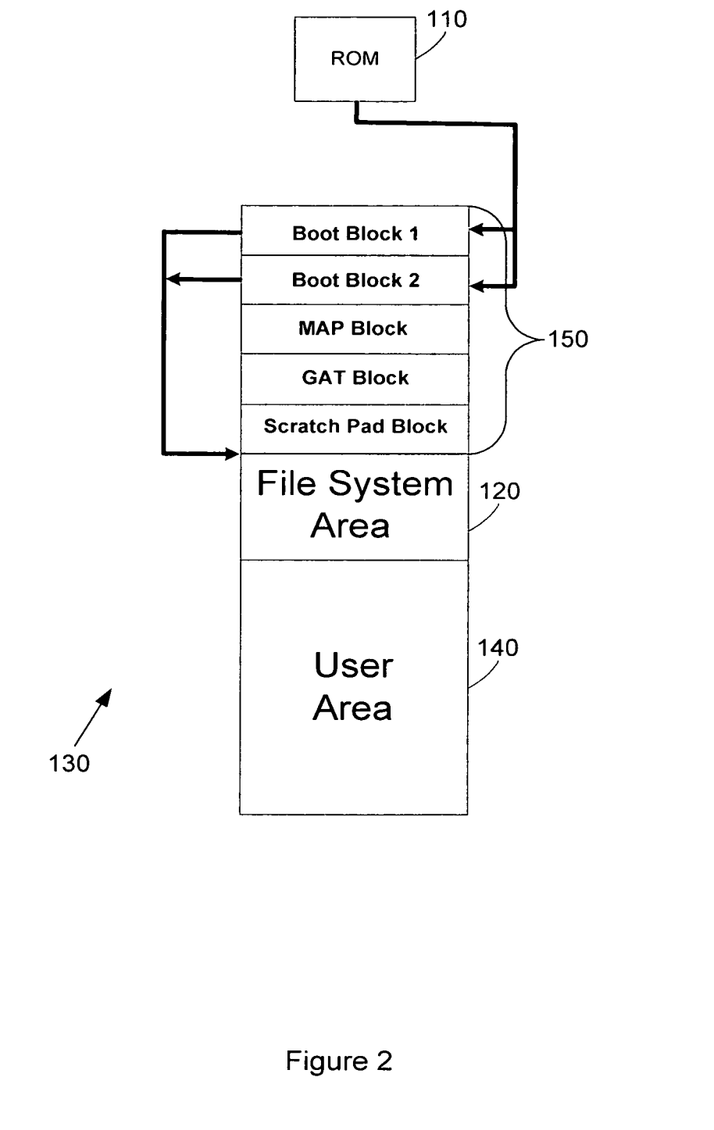
FIG. 2 is an illustration of a memory organization of a memory device of an embodiment.

FIG. 2 shows a memory organization of the memory device 100. As shown in FIG. 2, unlike the prior memory device described above, the computer-executable instructions in the ROM 110 in this memory device 100 contain a pointer to the location of the boot block(s) (boot block 2 is used when boot block 1 becomes filled, and vice versa)—not the location of the file system area 120. The boot block contains a pointer to the location of the directory in the file system area 120, which contains a pointer to the location of the firmware in the file system area 120. Accordingly, while the instructions in ROM 10 in the prior memory device allowed the circuitry to find the file system area (and the directory in the file system area pointed to the firmware), the instructions in the ROM 110 of this memory device 100 allow the circuitry 105 to find the boot blocks, which point to the directory in the file system area 120, which points to the firmware. Accordingly, while the prior memory device provided one level of indirection to the firmware (a pointer in a directory to the firmware), the memory device 100 in this embodiment provides two levels of indirection to the firmware (a pointer to the directory, which itself contains a pointer to the firmware).

Two levels of indirection to the firmware makes performing a write-abort-safe firmware update much easier than when only one level of indirection is used. For example, when a firmware update is needed, a location in the memory 120 is allocated for the firmware update, and then the firmware update is written into the allocated location in the memory 120. (The firmware update can comprise new files or some files copied from the previously-written version of the firmware.) A pointer to the firmware update is then written in the directory. Finally, a pointer to the directory is written as a new single sector in the boot block (i.e., the location in the memory 120 that is read during boot-up of the memory device 100). (Since the new pointer to the new firmware would be read instead of the old pointer to the old firmware, the old firmware can be erased.) In this way, a firmware update is performed as a completely atomic operation with a single write to the boot block. If there is a write-abort at any point before the pointer to the new directory is written in the boot block, the existing pointer in the boot block will point to the old copy of the firmware, so the memory device 100 will be operational despite the write abort. (In such a write-abort situation, the abandoned firmware update can be detected and deleted by initialization code in the memory device 100 upon startup.) That is, the memory device 100 will always either be able to read the previous version of the firmware using the existing pointer or the new version of the firmware using the new pointer. Accordingly, unlike the firmware update process in a memory organization with only one level of indirection, the firmware update process in a memory organization with two levels of indirection only needs to deal with one state the latest boot block entry.

Figure 3:
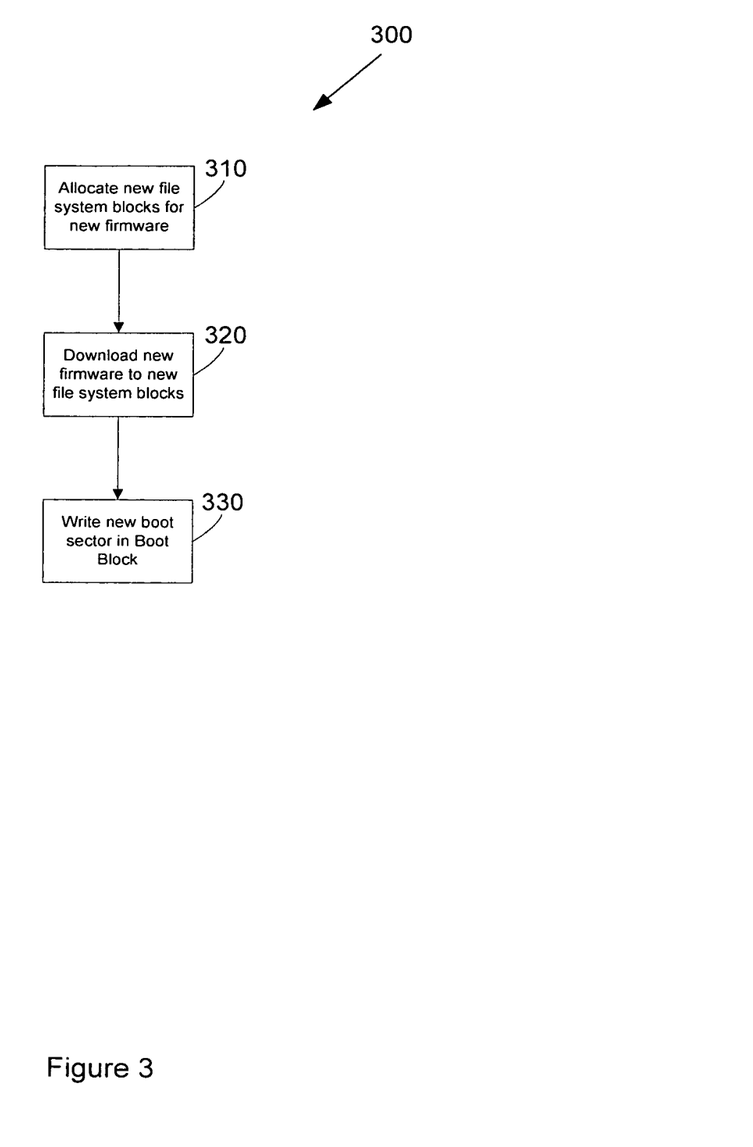
FIG. 3 is a flowchart of a method of an embodiment for performing a write-abort-safe firmware update.
Figure 4:
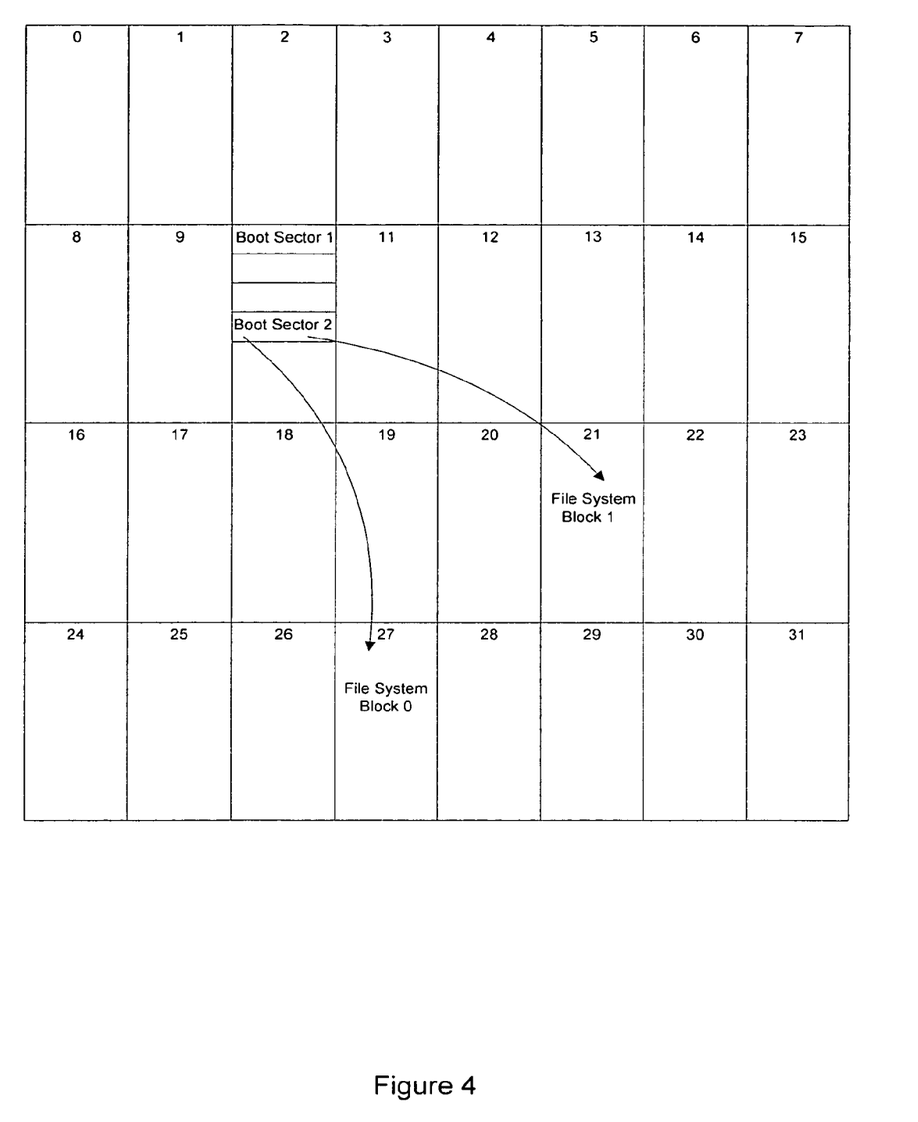
FIG. 4 is an illustration of blocks of memory of an embodiment before a write-abort-safe firmware update is performed.
Figure 5:
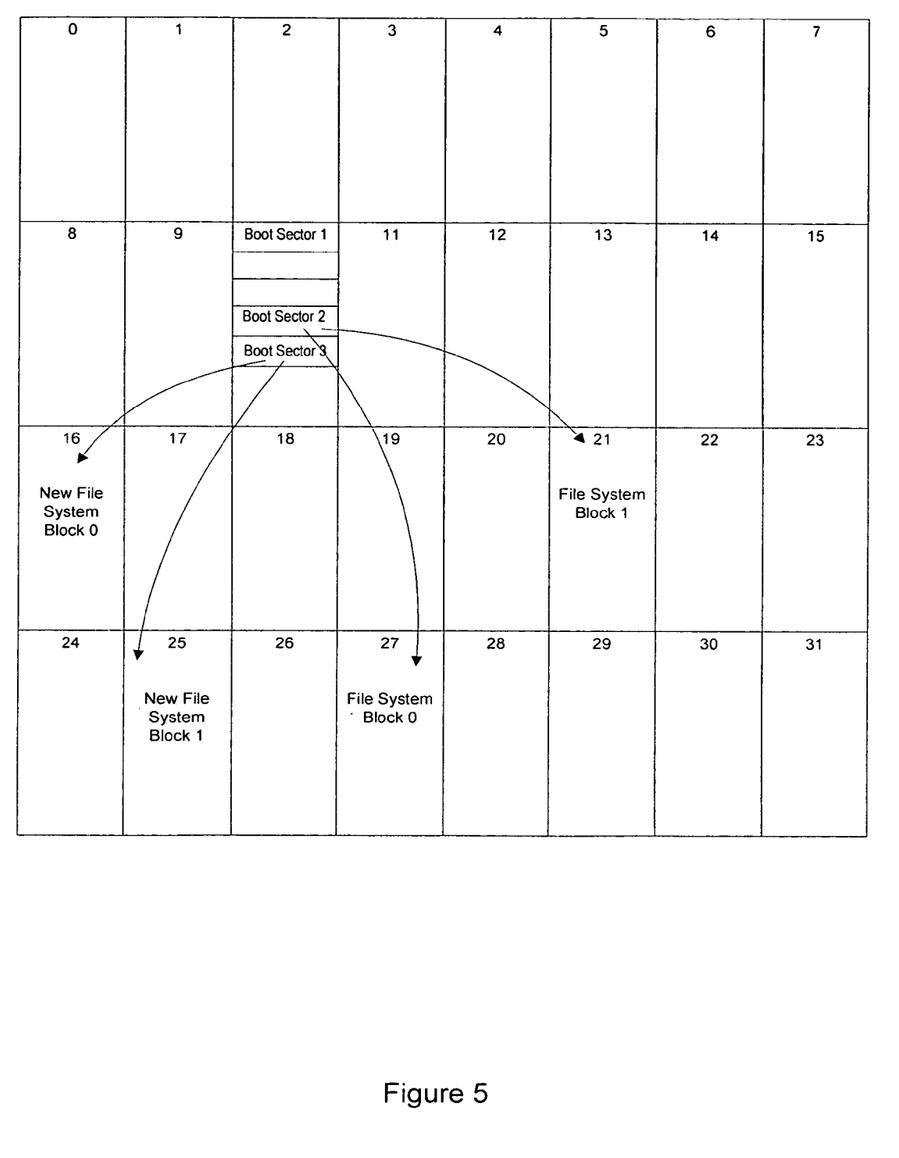
FIG. 5 is an illustration of blocks of memory of an embodiment after a write-abort-safe firmware update is performed.

With the general operation described, specific examples will now be discussed in reference to FIGS. 3-6. FIG. 3 is a flowchart 300 of an embodiment for performing a write-abort-safe firmware update, which will be illustrated in conjunction with the blocks of memory shown in FIGS. 4 and 5 (each block comprises a plurality of pages). In FIG. 4, block 10 of the memory 120 stores two boot sectors: an outdated boot sector 1 and a current boot sector 2, which points to file system blocks 0 and 1 in blocks 27 and 21, respectively. With reference to FIG. 3, when a firmware update is desired, new blocks are allocated for new file system blocks to store the new firmware (act 310). With reference to FIG. 5, the new blocks are blocks 16 and 25. Then, the new firmware is downloaded to the new file system blocks (act 320). Finally, a new boot sector 330 is written in the boot block (act 330). This is shown in FIG. 5 by boot sector 3, which is the last-written (and, therefore, most current) boot sector in the boot block. This last sector write is the atomic operation that changes the pointers.

Figure 6:
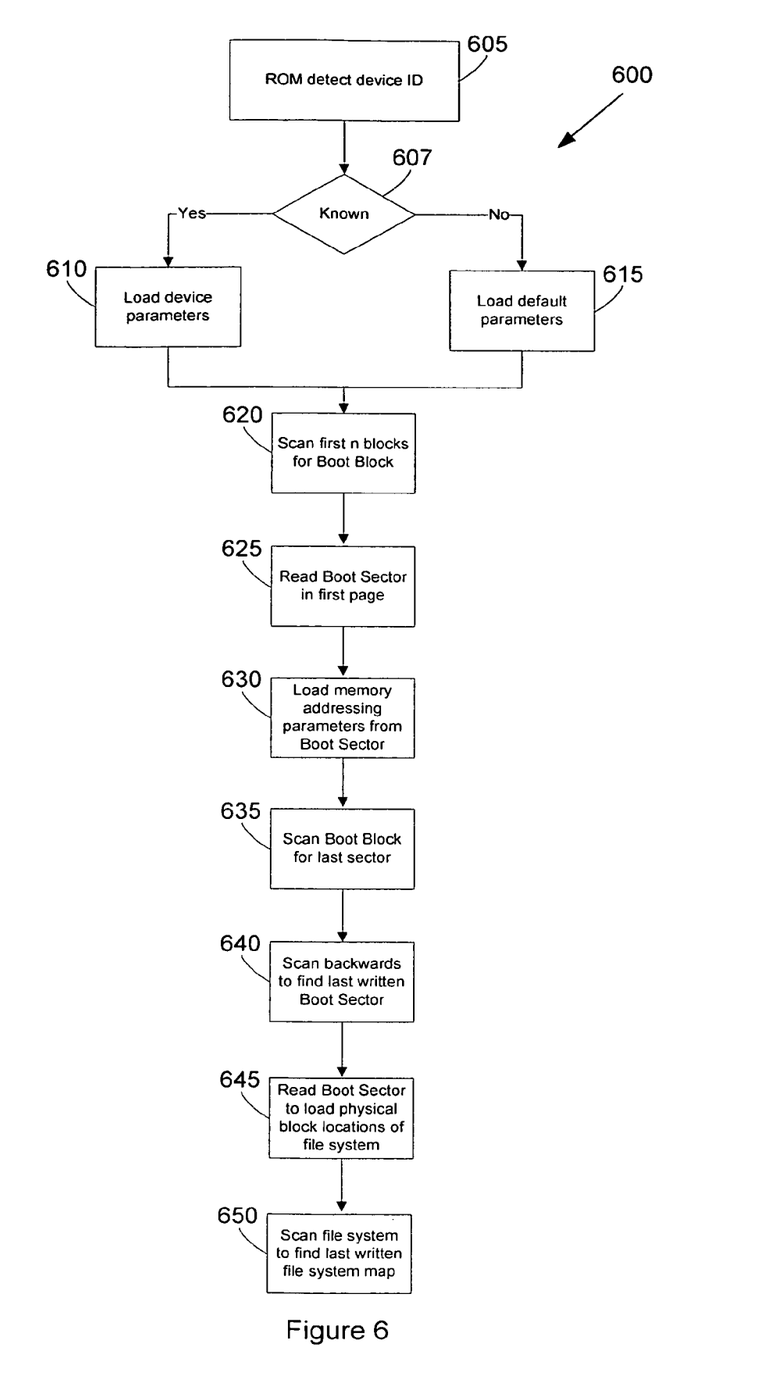
FIG. 6 is a flowchart of a method of an embodiment for reading a write-abort-safe firmware update.

Turning again to the drawings, FIG. 6 is a flowchart 600 of an embodiment for reading a write-abort-safe firmware update. First, the ROM code detects the identifier of the memory device 100 (the "device ID") (act 605) and determines whether the identifier is known (act 607). If the identifier is known, device parameters (such as address translation parameters) associated with that identifier are loaded from ROM 110. If the identifier is not known, default device parameters are loaded from ROM 110 (act 615). Using the known or default address translation parameters, the circuitry 105 scans the first n blocks in the memory 120 of the boot block (act 620). The boot block can be identified, for example, by a signature in the data area or the header. The boot sector in the first page is read (act 625), and the memory addressing parameters from the boot sector are loaded (act 630). Then, the boot block is scanned for the last sector (act 635), and the boot block is scanned backwards to find the last-written boot sector (act 640) (in FIG. 4, boot sector 2; in FIG. 5, boot sector 3). As explained above, the last-written boot sector contains a pointer to the most-recent version of the firmware. The last-written boot sector is then read to load the physical block locations of the file system (act 645), and the file system is scanned to find the last-written file system map, which is a directory containing a pointer to the file system update (act 650).

Having two levels of indirection provides advantages in addition to providing a very simple atomic update of firmware. For example, in addition to solving the problem of updating firmware in a write-abort-safe manner practical for ROM code, these embodiments allow file system blocks to be managed by operational code in whatever manner necessary. Accordingly, with two levels of indirection, a directory can be easily moved around the memory 120 to avoid wear problems, which is much more problematic in organizations with only one level of indirection. Additionally, file system blocks can be moved around the memory 120 to provide a "read scrub." (Multiple reads of a given block can cause a memory error in an adjacent block, which can cause an uncorrectable error to occur unless the data in that block is moved and refreshed by performing a "read scrub").

As another advantage, with these embodiments, NAND geometry information can be stored in sector 0 of the control blocks to allow use of memories not supported at ROM development time. Because the code in the ROM 110 is somewhat generic in that it will be loaded onto a variety of memory devices, the ROM 110 may not store the correct geometry information for the memory 120 (e.g., information needed for the addressing scheme of the memory 120). A few extra bytes of information in the boot block can tell the circuitry 105 how to address the memory 120 to find other blocks.

As yet another advantage, these embodiments can be used to update redundant copies of firmware files in less than 250 ms. It may be desirable to store two copies of firmware in different blocks for redundancy purposes in case there is a block failure. However, depending on the configuration of the memory device, two garbage collections may be needed for these two independent blocks in order to update the firmware files. Unfortunately, this can take more than 250 ms, which is the SD timeout period. With this embodiment, firmware redundant copies can be stored in different pages in the same block, which allows update of small amounts of data in firmware blocks within a single garbage collection time (less than 250 ns). All these operations can be performed without sacrificing additional physical blocks and can instead use normal update blocks managed by the system.

Many alternatives can be used with these embodiments. For example, in one alternative embodiment, a special block contains pointers to both boot blocks in case the first 32 blocks or more are bad. In operation, ROM will scan up to number blocks for boot blocks. In the case that ROM does not find any good boot block, ROM will rely on this special block in the first few blocks, which would contain multiple copies of pointers to boot blocks in the user area.

It is intended that the foregoing detailed description be understood as an illustration of selected forms that the invention can take and not as a definition of the invention. It is only the following claims, including all equivalents, that are intended to define the scope of this invention. It should be noted that the acts recited in the claims can be performed in any order—not necessarily in the order in which they are recited. Finally, it should be noted that any aspect of any of the preferred embodiments described herein can be used alone or in combination with one another.

What is claimed is:

1. A method for performing a write-abort-safe firmware update on a memory device, the method comprising:
    allocating a location in a memory of a memory device for a firmware update;
    writing the firmware update into the allocated location in the memory;
    writing a pointer to the firmware update in a directory after writing the firmware update into the allocated location in the memory; and
    writing a pointer to the directory in a last-written sector in a boot block in the memory that is read during boot-up of the memory device after writing the pointer to the firmware update in the directory.

2. The method of claim 1, wherein the firmware update and the directory are part of updated file system data written to the memory.

3. The method of claim 1, wherein the firmware update comprises data copied from previously-stored firmware.

4. The method of claim 1 further comprising erasing previously-stored firmware.

5. The method of claim 1, wherein the boot block further comprises pointers for managing user data in the memory.

6. The method of claim 1, wherein the boot block further comprises geometry information of the memory.

7. The method of claim 1, wherein the memory device further comprises a read only memory storing computer-executable instructions for reading, during boot-up of the memory device, the boot block storing the pointer to the directory.

8. The method of claim 1 further comprising storing a redundant copy of the firmware update in the memory.

9. The method of claim 8, wherein both the firmware update and the redundant copy of the firmware update are stored in less than 250 ms.

10. The method of claim 1, wherein during boot-up of the memory device, a processor of the memory device locates the pointer to the directory in the last-written sector in the boot block by scanning the boot block for a last sector, and then scanning backwards to find the last-written sector in the boot block.

11. A method for performing a write-abort-safe firmware update on a memory device, the method comprising:
    allocating a block in a memory of a memory device for updated file system data comprising a firmware update and a directory;
    writing the updated file system data into the allocated location in the memory;
    writing a pointer to the firmware update in the directory after writing the updated file system data into the allocated location in the memory; and
    writing a pointer to the updated file system data in a last-written sector in a boot block in the memory after writing the pointer to the firmware in the directory, wherein the boot block is read during boot-up of the memory device.

12. The method of claim 11, wherein the firmware update comprises data copied from previously-stored firmware.

13. The method of claim 11 further comprising erasing previously-stored firmware.

14. The method of claim 11, wherein the boot block further comprises pointers for managing user data in the memory.

15. The method of claim 11, wherein the boot block further comprises geometry information of the memory.

16. The method of claim 11, wherein the memory device further comprises a read only memory storing computer-executable instructions for reading the boot block during boot-up of the memory device.

17. The method of claim 11 further comprising storing a redundant copy of the firmware update in the memory.

18. The method of claim 17, wherein both the firmware update and the redundant copy of the firmware update are stored in less than 250 ms.

19. The method of claim 17, wherein the redundant copy of the firmware update is stored in a same block that stores the firmware update.

20. The method of claim 11, wherein during the boot-up of the memory device, a processor of the memory device locates the pointer to the updated file system data in the last-written sector in the boot block in the memory by scanning the boot block for a last sector, and then scanning backwards to find the last-written sector in the boot block.

21. A memory device comprising:
a memory;
circuitry operative to:
allocate a location in the memory for a firmware update;
write the firmware update into the allocated location in the memory;
write a pointer to the firmware update in a directory after writing the firmware update into the allocated location in the memory;
write a pointer to the directory in a last-written sector in a boot block in the memory that is read during boot-up of the memory device after writing the pointer to the firmware update in the directory; and
during the boot-up of the memory device, locate the pointer to the directory in the boot block in the memory.

22. The memory device of claim 21, wherein the firmware update and the directory are part of updated file system data written to the memory.

23. The memory device of claim 21, wherein the firmware update comprises data copied from previously-stored firmware.

24. The memory device of claim 21, wherein the circuitry is further operative to erase previously-stored firmware.

25. The memory device of claim 21, wherein the boot block further comprises pointers for managing user data in the memory.

26. The memory device of claim 21, wherein the boot block further comprises geometry information of the memory.

27. The memory device of claim 21 further comprising a read only memory storing computer-executable instructions for reading, during boot-up of the memory device, the boot block storing the pointer to the directory.

28. The memory device of claim 21, wherein the circuitry is further operative to store a redundant copy of the firmware update in the memory.

29. The memory device of claim 28, wherein both the firmware update and the redundant copy of the firmware update are stored in less than 250 ms.

30. The memory device of claim 21, wherein during boot-up of the memory device, the circuitry is configured to locate the pointer to the directory in the last written sector in the boot block in the memory by scanning the boot block for a last sector, and then scanning backwards to find the last-written sector in the boot block.

31. A memory device comprising:
a memory;
circuitry operative to:
allocate a block in the memory for updated file system data comprising a firmware update and a directory;
write the updated file system data into the allocated location in the memory;
write a pointer to the firmware update in the directory after writing the updated file system data into the allocated location in the memory;
write a pointer to the updated file system data in a last-written sector in a boot block in the memory after writing the pointer to the firmware update in the directory, wherein the boot block is read during boot-up of the memory device;
during the boot-up of the memory device, locate the pointer to the updated file system data in the boot block in the memory.

32. The memory device of claim 31, wherein the firmware update comprises data copied from previously-stored firmware.

33. The memory device of claim 31, wherein the circuitry is further operative to erase previously-stored firmware.

34. The memory device of claim 31, wherein the boot block further comprises pointers for managing user data in the memory.

35. The memory device of claim 31, wherein the boot block further comprises geometry information of the memory.

36. The memory device of claim 31 further comprising a read only memory storing computer-executable instructions for reading the boot block during boot-up of the memory device.

37. The memory device of claim 31, wherein the circuitry is further operative to store a redundant copy of the firmware update in the memory.

38. The memory device of claim 37, wherein both the firmware update and the redundant copy of the firmware update are stored in less than 250 ms.

39. The memory device of claim 31, wherein the memory comprises a non-volatile, solid-state memory.

40. The memory device of claim 31, wherein during boot-up of the memory device, the circuitry is configured to locate the pointer to the updated file system data in the last written sector in the boot block in the memory by scanning the boot block for a last sector, and then scanning backwards to find the last written sector in the boot block.

* * * * *

UNITED STATES PATENT AND TRADEMARK OFFICE
CERTIFICATE OF CORRECTION

| | | Page 1 of 1 |
|---|---|---|
| PATENT NO. | : 8,775,758 B2 | |
| APPLICATION NO. | : 12/005727 | |
| DATED | : July 8, 2014 | |
| INVENTOR(S) | : Tomlin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 909 days.

Signed and Sealed this

Fourth Day of August, 2015

Michelle K. Lee
*Director of the United States Patent and Trademark Office*